US010328820B2

(12) United States Patent
Cai et al.

(10) Patent No.: US 10,328,820 B2
(45) Date of Patent: Jun. 25, 2019

(54) FUEL CELL SYSTEM START-UP USING VOLTAGE PROFILE CONTROL

(71) Applicant: GM GLOBAL TECHNOLOGY OPERATIONS LLC, Detroit, MI (US)

(72) Inventors: Jun Cai, Troy, MI (US); Joseph Castelluccio, Menominee, MI (US); Sergio E. Garcia, Commerce Township, MI (US); Andrew J. Maslyn, Novi, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 224 days.

(21) Appl. No.: 15/609,893

(22) Filed: May 31, 2017

(65) Prior Publication Data

US 2018/0345819 A1    Dec. 6, 2018

(51) Int. Cl.

| | |
|---|---|
| *H01M 8/04* | (2016.01) |
| *B60L 15/00* | (2006.01) |
| *H01M 8/04858* | (2016.01) |
| *H01M 8/04302* | (2016.01) |
| *H01M 16/00* | (2006.01) |
| *H01M 8/04746* | (2016.01) |
| *B60L 15/04* | (2006.01) |
| *H02P 27/06* | (2006.01) |
| *B60L 50/51* | (2019.01) |
| *B60L 50/64* | (2019.01) |
| *B60L 50/72* | (2019.01) |
| *H01M 8/1018* | (2016.01) |
| *H02M 3/156* | (2006.01) |

(52) U.S. Cl.
CPC ........... *B60L 15/007* (2013.01); *B60L 15/04* (2013.01); *B60L 50/51* (2019.02); *B60L 50/64* (2019.02); *B60L 50/72* (2019.02); *H01M 8/0488* (2013.01); *H01M 8/04302* (2016.02); *H01M 8/04753* (2013.01); *H01M 16/006* (2013.01); *H02P 27/06* (2013.01); *B60L 2210/14* (2013.01); *B60L 2210/42* (2013.01); *B60L 2240/527* (2013.01); *H01M 2008/1095* (2013.01); *H01M 2250/20* (2013.01); *H02M 3/156* (2013.01)

(58) Field of Classification Search
CPC ....................................................... H01M 8/04
See application file for complete search history.

(56) References Cited

U.S. PATENT DOCUMENTS

2012/0121941 A1* 5/2012 Hasegawa ......... H01M 8/04947
429/7

* cited by examiner

*Primary Examiner* — Jacob B Marks
(74) *Attorney, Agent, or Firm* — Quinn IP Law

(57) ABSTRACT

A fuel cell system for a vehicle or other system includes a fuel cell stack, a DC-DC boost converter, and a controller. The stack has a plurality of fuel cells and a stack voltage. The controller regulates the stack voltage during start-up of the fuel cell stack via the boost converter, and is programmed with a plurality of calibrated voltage profiles each having a corresponding magnitude and rate of change. The controller is configured to execute a method which includes detecting an air start of the fuel cell stack in response to a requested start-up of the fuel cell stack. The controller then enforces the stack voltage to the predetermined voltage profiles during an actual start-up of the fuel cell stack, doing so via regulation of the boost converter and using the plurality of calibrated voltage profiles.

20 Claims, 3 Drawing Sheets

FUEL CELL SYSTEM START-UP USING VOLTAGE PROFILE CONTROL

A fuel cell stack is an electrochemical device capable of producing electricity from a paired oxidation/reduction reaction that occurs in a stack of identically configured fuel cells. Each fuel cell includes an electrolyte that serves to transport charged particles between oppositely charged electrodes. A platinum-based or other suitable catalyst speeds the catalytic process at the electrodes. Hydrogen and oxygen are the basic fuels of the oxidation/reduction reaction, which allows water to be produced as an inert byproduct of the reaction. As a result, fuel cells may be used as an alternative source of clean energy in vehicle propulsion systems, power plants, and other mobile or stationary systems.

In a fuel cell system, the stack start-up process is defined as the elapsed period between initiation of the paired oxidation/reduction reaction and a later point in time at which the stack ultimately reaches a stable output voltage. The fuel cell system thus begins outputting usable levels of power upon conclusion of the start-up process. Certain issues may prevent a given fuel cell system from experiencing a successful start-up, such as an "air start" event or a sudden spike in cell voltage. An air start event occurs when negligible levels of hydrogen remain in the stack anode after an extended off-time period, e.g., when a fuel cell vehicle remains parked in an off state over a weekend. An air start may result in negative anode potential and possible stack degradation. Voltage spikes at levels above 900 millivolts may lead to oxidation and corrosion of the catalyst, which in turn may reduce the available surface area of the catalyst and adversely affect fuel cell efficiency.

SUMMARY

A control method is disclosed herein for controlling the output voltage of a fuel cell stack, i.e., a stack voltage, during a stack start-up process, doing so according to predetermined voltage profiles, with each profile having a corresponding magnitude and rate of change. The method includes using a direct current-direct current (DC-DC) boost converter to control the stack voltage to the predetermined voltage profiles such that negative potential of the stack anode is largely prevented, as well as to reduce occurrences of catalyst oxidation.

A fuel cell system includes a fuel cell stack having a plurality of fuel cells and a stack voltage, and also includes a DC-DC boost converter and a controller. The controller, which is configured to regulate the stack voltage during start-up of the fuel cell stack via the DC-DC boost converter, is programmed with calibrated voltage profiles each having a corresponding magnitude and rate of change. The controller is also configured to detect an air start of the fuel cell stack in response to a requested start-up of the fuel cell stack. In response to the detected air start, the controller enforces predetermined voltage profiles of the stack voltage during an actual start-up of the fuel cell stack via regulation of the boost converter, doing so using the calibrated voltage profiles.

The calibrated voltage profiles include a first voltage profile corresponding to an anode pressurization stage and a second voltage profile corresponding to a cathode fill stage, with the second voltage profile having a rate of change that is less than that of the first voltage profile.

The controller is programmed to detect the air start of the fuel cell stack using an output of a Gas Concentration Estimation (GCE) model. The output of the GCE model in this embodiment may be an estimated oxygen level in an anode plate of the fuel cell stack. The controller may receive, as a set of inputs, each of an off time, a temperature, and a pressure value of the fuel cell stack, with the output of the GCE model determined as a function of the set of inputs.

The DC-DC boost converter may include a semiconductor switch and a gate drive circuit, with the controller applying or enforcing the voltage profiles by controlling a duty cycle of the semiconductor switch, via the gate drive circuit, during a voltage recovery operating mode.

The controller may include a microprocessor that is part of the DC-DC boost converter, and that controls the duty cycle of the semiconductor switch during the voltage recovery operating mode. The controller is configured to enforce the voltage profiles after the start-up is complete by controlling the DC-DC boost converter in a current control mode.

The fuel cell system may include a high-voltage DC battery, a power inverter module electrically connected to the battery, an axle, and an electric machine operable for outputting torque to the axle. A road wheel may be rotatably connected to the axle in a non-limiting motor vehicle embodiment.

A vehicle includes the fuel cell stack and DC-DC boost converter, a battery pack connected to the fuel cell system and having a DC output voltage, a power inverter module (PIM) electrically connected to the battery pack and configured to convert the DC output voltage to an alternating current (AC) voltage, an electric machine electrically connected to the PIM and energized via the AC voltage to produce an output torque, a drive wheel connected to the electric machine and driven via the output torque to propel the vehicle, and a controller.

The controller is configured to execute a method, including detecting an air start of the fuel cell stack in response to a requested start-up of the fuel cell stack, with the controller programmed with calibrated voltage profiles each having a corresponding magnitude and rate of change. The method also includes enforcing a predetermined voltage profile of the stack voltage responsive to the detected air start during an actual start-up of the fuel cell stack, including regulating operation of the DC-DC boost converter using the plurality of calibrated voltage profiles. The calibrated voltage profiles in an embodiment include a first voltage profile corresponding to an anode pressurization stage and a second voltage profile corresponding to a cathode fill stage, with the second voltage profile having a rate of change that is less than that of the first voltage profile.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes combinations and sub combinations of the elements and features presented above and below.

Figure 1:
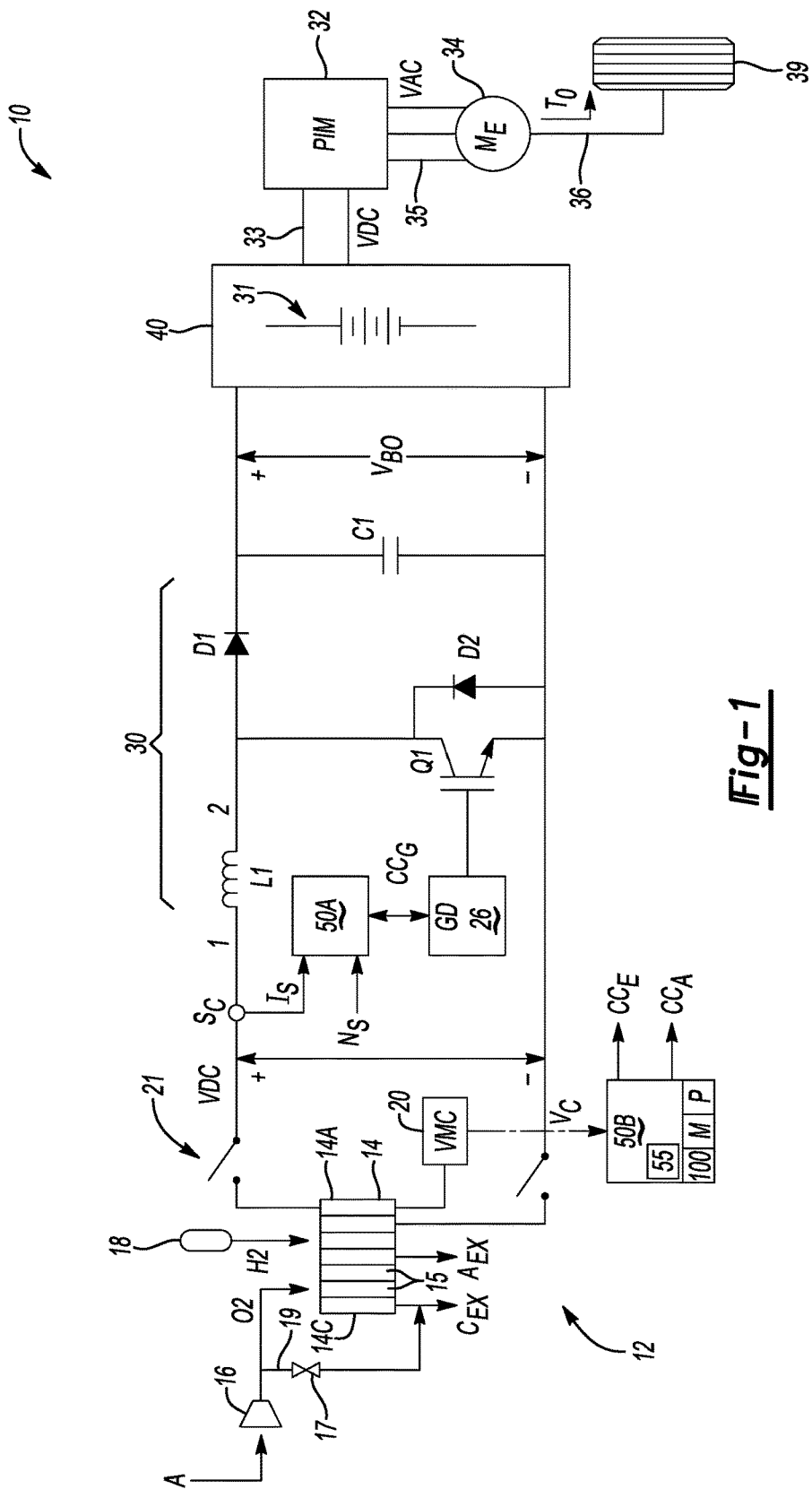
FIG. 1 is a schematic diagram of an example vehicle having a fuel cell stack and a controller configured to control an output voltage of the stack, i.e., a stack voltage, to predetermined voltage profiles during a stack start-up process.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

Referring now to the drawings, wherein like reference numbers refer to like features throughout the several views, FIG. 1 schematically depicts an example fuel cell system 12. The fuel cell system 12 includes a fuel cell stack 14 adaptable for use as a direct current (DC) power supply in a vehicle 10, for instance a motor vehicle as shown, or as a boat or other marine vehicle, aerospace vehicle, robot, or other mobile platform. Alternatively, the fuel cell stack 14 may be used as a power supply as part of a stationary power plant (not shown) or in other systems requiring onboard generation of DC power. For illustrative consistency, the fuel cell stack 14 of FIG. 1 will be described hereinafter in the context of supporting a propulsion function aboard the vehicle 10 without limiting the fuel cell stack 14 to such an application.

The fuel cell stack 14 includes a plurality of fuel cells 15 arranged between respective anode and cathode plates 14A and 14C. While the particular type of fuel cell stack 14 and its constituent fuel cells 15 may vary with the intended application of the fuel cell system 12, according to an example embodiment each of the fuel cells 15 may be a polymer electrolyte membrane/proton exchange membrane (PEM)-type fuel cell delivering a relatively high power density with a low weight and volume. PEM-type fuel cells use a catalyst in the form of platinum or platinum alloy and a solid electrolyte polymer material (not shown). The fuel cells 15, when configured as PEM-type fuel cells, operate using a supply of gaseous hydrogen (arrow H2) from a hydrogen storage tank 18 and oxygen (arrow O2), with the oxygen (arrow O2) typically supplied from ambient air (arrow A) via a compressor 16.

Within the example fuel cell system 12 of FIG. 1, a stack bypass line 19 may be routed around the fuel cell stack 14. A bypass valve 17 disposed within the bypass line 19 has a variable open/closed position that may be automatically set, e.g., via a controller 50B. Control of the bypass valve 17 allows the controller 50B to regulate operation of the fuel cell stack 14, e.g., via an air control signal (arrow $CC_A$) by setting an amount of the oxygen (arrow O2) flowing through or bypassing the fuel cell stack 14. Oxygenated air that is discharged from the bypass valve 17 ultimately rejoins cathode exhaust (arrow $C_{EX}$) expelled from the cathode plate 14C before being vented from the fuel cell stack 14. Anode exhaust (arrow $A_{EX}$) is similarly vented from the anode plate 14A. The controller 50B may alternatively regulate operation of the fuel cell stack 14 via an electrical control signal (arrow $CC_E$), i.e., via voltage or current control of the DC-DC boost converter 30 as indicated below.

The fuel cell system 12 of FIG. 1 further includes a voltage monitoring circuit (VMC) 20. The VMC 20 may be configured to monitor a voltage level of the fuel cell stack 14, hereinafter referred to as a stack voltage, to measure minimum and maximum cell voltages (arrow $V_C$) of the individual fuel cells 15, and to calculate an average cell voltage. Such collective voltage control values may be used by the controller 50B to regulate operation of the fuel cell stack 14 in response to changing power demands, such as increased driver throttle request in the illustrated vehicular propulsion embodiment.

The example vehicle 10 includes a DC-DC boost converter 30 arranged between the fuel cell system 12 and a high-voltage (HV) system 40, the latter including a battery 31. The boost converter 30 in the embodiment of FIG. 1 includes a semiconductor switch Q1 and a diode (D2), the former shown here as an example insulated gate bipolar transistor (IGBT). The semiconductor switch Q1 has an on/off state that is driven via a gate drive (GD) circuit 26 using a gate drive signal (arrow $CC_G$) from another controller 50A, or by the controller 50B in a single-controller embodiment. A magnitude and direction/sign of a stack current (arrow $I_S$) from the fuel cell stack 14 may be measured by a current sensor ($S_C$) and communicated to the controller 50A, where the measured magnitude and direction of the stack current (arrow $I_S$) is used to control the on/off state of the semiconductor switch Q1.

The intended function of the boost converter 30 of FIG. 1 is to increase an input voltage, here a stack voltage ($V_S$), to a higher or "boosted" output voltage level ($V_{BO}$). The voltage boosting operation may be achieved via pulse-width modulation or other switching control of the semiconductor switch Q1, as is well known in the art. During an amount of time during which the semiconductor switch Q1 is turned on and thus conducting, the stack current (arrow $I_S$) flows to an inductor L1 having primary (1) and secondary (2) windings, through the semiconductor switch Q1, and back into the fuel cell stack 14. Energy is stored in the inductor L1 as voltage rises across the inductor L1. A diode (D1) and capacitor (C1) may be arranged downstream of the inductor L1 as shown, with the capacitor C1 in parallel with the HV system 40.

When the semiconductor switch Q1 is commanded off by the controller 50A, energy stored in the inductor L1 causes the stack current (arrow $I_S$) to flow to an output load, which is the HV system 40 in the particular embodiment of FIG. 1. The voltage at the output of the boost converter 30 ($V_{BO}$), which is the electric potential across the capacitor C1, is the sum of the stack voltage ($V_S$) and a voltage across the inductor L1. Off/on cycling of the semiconductor switch Q1 occurs cyclically, with the total cycle time defined as the sum of the off and on times. The duty cycle of the semiconductor switch Q1 may therefore be defined as $T_{ON}/T_{SWITCH}$, with $T_{ON}$ being the on time of the switch Q1 and $T_{SWITCH}$ being the total cycle time.

As part of the example fuel cell system 12 depicted in FIG. 1, the controllers 50A and controller 50B, which may be separate task-specific microprocessor-based devices as shown or a single device, may be programmed with instructions embodying the present method 100. The method 100 is used to differentiate an air start from an hydrogen start using different calibrated voltage profiles, e.g., based on the output of a gas concentration estimation model 55, and for using the boost converter 30 to control the fuel cell system 12 to such voltage profiles during a start-up of the fuel cell stack 14.

During normal operation, the controllers 50A, 50B control the duty cycle of the semiconductor switch Q1 as a function of the stack current (arrow $I_S$). During execution of the method 100 of FIG. 3, the controllers 50A, 50B transitions to controlling the duty cycle of the semiconductor switch Q1 as a function of the stack voltage ($V_S$), particularly during a voltage recovery mode, in order to closely regulate the boosted output voltage ($V_{BO}$).

Still referring to FIG. 1, when the fuel cell system 12 of FIG. 1 powers an alternating current (AC) device such as a polyphase electric machine ($M_E$) 34, the magnitude of the AC voltage (VAC) requirement of the electric machine 34 may exceed that of the available DC voltage (VDC) output of the fuel cell stack 14. The boost converter 30 thus acts to increase the voltage level supplied to the electric machine 34. Additionally, a power inverter module (PIM) 32 may be electrically connected to the HV system 40 and used to convert a DC voltage on a DC high-voltage bus 33 to an AC voltage level suitable for energizing individual phase windings 35 of the electric machine 34, for instance a traction motor suitable for propelling the vehicle 10. Output torque (arrow $T_O$) from the electrical machine 34 may be delivered to an output member 36 in order to perform work aboard the vehicle 10, such as rotating a set of road wheels 39, only one of which is depicted for simplicity, so as to propel the vehicle 10 when the vehicle 10 is optionally embodied as a motor vehicle.

Although omitted for simplicity, as part of the fuel cell system 12 of FIG. 1 an opened/closed set of switches or contactors 21 may be controlled via the controller 50A or 50B in order to electrically disconnect the fuel cell stack 14 from the remainder of the fuel cell system 12, such as when the vehicle 10 is not running or during a potential high-voltage electrical fault. Additionally and likewise omitted for illustrative simplicity, lower-voltage auxiliary power may be provided to an auxiliary battery via an auxiliary power module, such as a DC-DC buck converter, which may be used to reduce voltage levels on the high-voltage bus 33 to lower voltage levels suitable for storage in the auxiliary battery, e.g., 12-15 VDC.

Figure 2A:
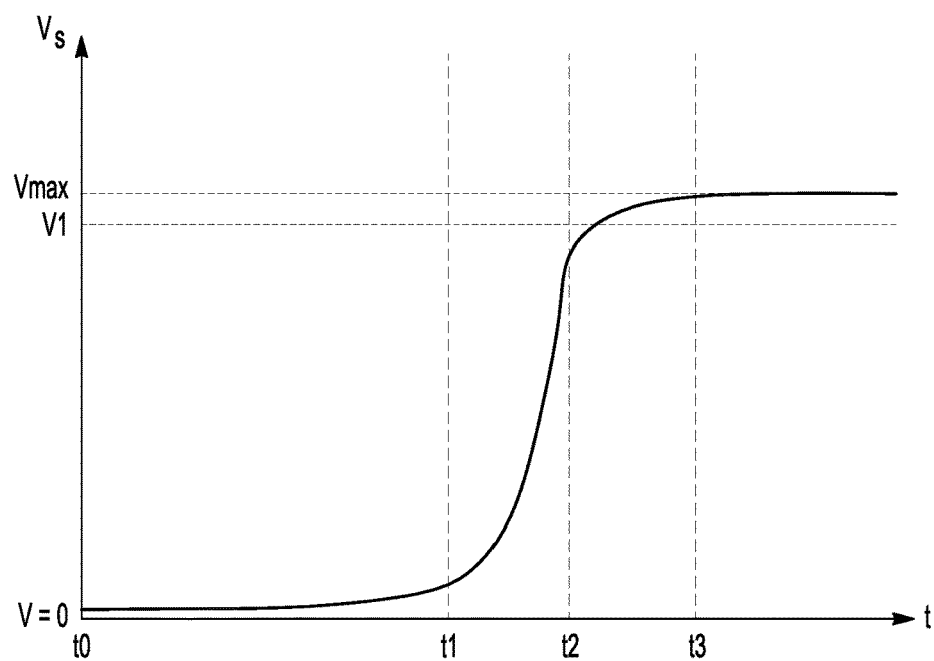
FIGS. 2A and 2B are representative voltage profiles for a hydrogen start and an air start, respectively.

Referring to FIG. 2A, a hydrogen start of the fuel cell stack 14 is defined herein as a start-up event in which an initial concentration of oxygen in the stack anode 14A of FIG. 1 is at or near zero, with an initial hydrogen concentration exceeding zero. During a hydrogen start, significant changes should not occur in the stack voltage ($V_S$) during the anode pressurization stage of stack start-up. Introduction of air (arrow A) into the cathode plate 14C of FIG. 1 will cause the stack voltage ($V_S$) to rise. A maximum voltage level (V1) that the fuel cell stack 14 is allowed to attain is capped in order to minimize voltage degradation. The maximum allowable voltage level (V1) is similar to the maximum/run-time voltage suppression level ($V_{MAX}$) of the stack 14, but may be set at a slightly lower level.

The hydrogen start-up profile for a given hydrogen start commences at or near 0 VDC. It is expected that the controller 50B can operate the stack 14 for a relatively short duration near 0 VDC up to the maximum allowable voltage (V1) as air (arrow A) enters from the cathode plate 14C of FIG. 1. The stack voltage ($V_S$), once it reaches the level of V1, will thereafter be allowed to reach the level of $V_{MAX}$ at a more gradual rate.

Figure 2B:
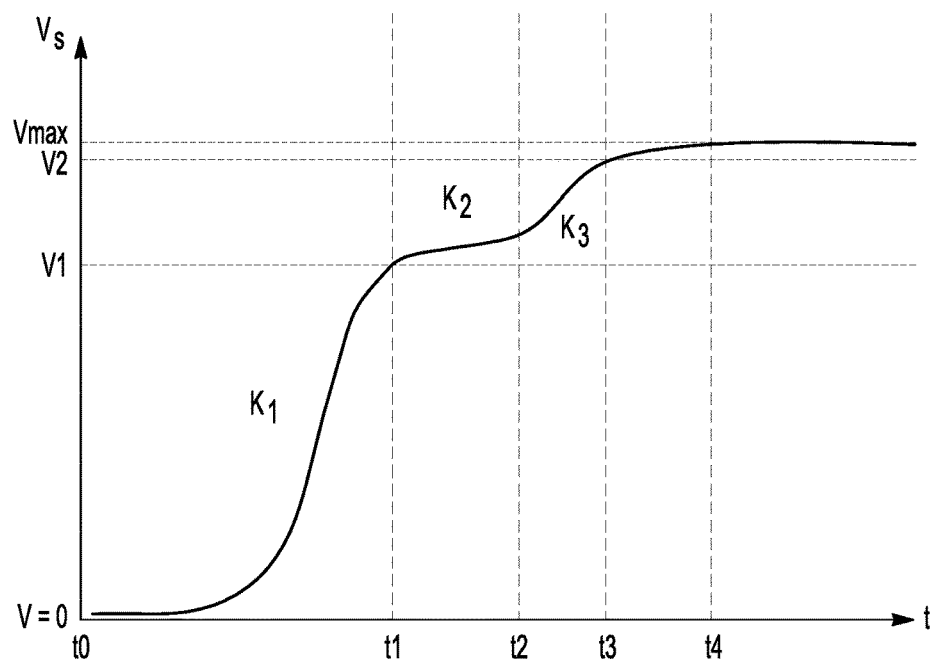

FIG. 2B shows a generic profile for an air start. An air start commences with a non-negligible oxygen concentration in the anode plate 14A of FIG. 1. In this situation, the stack voltage ($V_S$) rapidly rises during the anode pressurization stage of start-up, and requires a lower stack voltage limit (V1) and higher stack current to properly mitigate the potential voltage degradation, which is primarily due to cathode carbon corrosion. The duration of the corrosion event is equivalent to the amount of time it takes for hydrogen gas to completely fill and displace an initial gas volume of the fuel cell stack 14, typically between 100-500 ms. After the anode pressurization stage is complete, the stack voltage ($V_S$) will ramp to the hydrogen start voltage limit (V2). The example start-up event of FIG. 2B will finish in a manner that is similar to the hydrogen start event.

Figure 3:
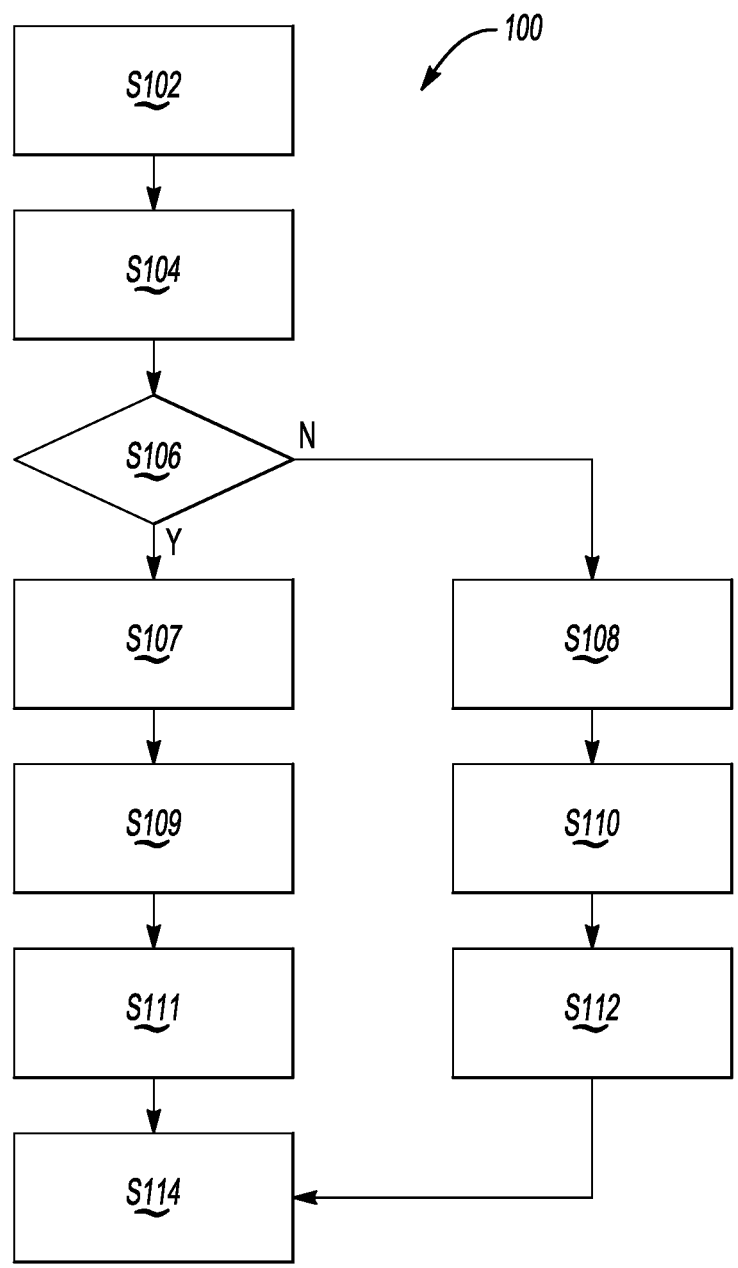
FIG. 3 is a flow chart describing an example method for controlling the stack voltage of the fuel cell system of FIG. 1 during start-up using predetermined voltage profiles.

FIG. 3 depicts an example embodiment of the method 100 noted above. Aspects of the method 100 may be implemented through computer-executable instructions, i.e., software applications or application programs executed by the controller 50A and/or 50B. The software may be stored on any of a variety of memory (M) of the controller 50A, 50B, including computer-readable such as CD-ROM, magnetic disk, bubble memory, and semiconductor memory, such as various types of RAM or ROM. Moreover, aspects of the method 100 may be practiced in distributed-computing environments in which tasks are performed by remote-processing devices linked through a communications network, e.g., a controller area network (CAN) bus (not shown). Although a specific algorithm is described with reference to FIG. 3, other methods of implementing the example machine-readable instructions may be used within the scope of the disclosure.

In general, the controllers 50A and 50B, by using the method 100, operate the DC-DC boost converter 30 of FIG. 1 in a regular current control mode through the first several stages of start-up, i.e., stack discharge, low-voltage power limitation, and auxiliary power management. Based on a decision from the gas concentration estimation (GCE) model 55, a decision is made as to whether the start event at hand is an air start or a hydrogen start. If it is a hydrogen start, the voltage profile information from the GCE model 55 will include a voltage setpoint and a voltage rise rate. If the start event is an air start, the voltage profile from the GCE model 55 will include three segments each with different voltage setpoints and rising rates. The DC-DC boost converter 30 may be commanded to operate in a voltage control mode during the stages of anode pressurization, cathode fill, and voltage stabilization, and then will return to the regular/current control mode when the last stage, voltage stabilization, is complete.

In general, the method 100 includes detecting an air start of the fuel cell stack 14 via the controller 50B in response to a requested start-up of the fuel cell stack 14, with the controller 50B programmed with a plurality of calibrated voltage profiles each having a corresponding magnitude and rate of change. Then, responsive to the detected air start, the method 100 includes enforcing a predetermined voltage profile of the stack voltage during an actual start-up of the fuel cell stack 14, including regulating operation of the DC-DC boost converter 30 using the calibrated voltage profiles.

In an example embodiment beginning with step S102, upon request for start-up of the fuel cell system 12 of FIG. 1, e.g., a requested ignition-based start of the vehicle 10 shown in FIG. 1, the controller 50B wakes up and begins communicating with the fuel cell system 12. The method 100 then proceeds to step S104.

Step S104 entails operating the boost converter 30 of FIG. 1 in a regular/current control mode via operation of the controller 50A. As is known in the art, operation of a fuel cell stack such as the example stack 14 of FIG. 1 proceeds according to multiple stages: stack discharge, low-voltage power limitation, auxiliary power management, anode pressurization, cathode fill, and voltage stabilization. Step S104 includes controlling the stack discharge, low-voltage power limitation, and auxiliary power management stages by commanding the boost converter 30 to operate in a default mode, i.e., a current control mode in which the duty cycle to the semiconductor switch S1 of FIG. 1 is determined as a function of the stack current (arrow $I_S$) as measured by the sensor ($S_C$). The method 100 then proceeds to step S106.

Step S106 may include determining whether an air start event is present. For instance, the GCE model 55 noted above with reference to FIG. 1 may be used to estimate whether oxygen (arrow O2) remains in the anode plate 14A. In an example embodiment, the GCE model 55 may consider off-time, temperature of the ambient and/or the fuel cell stack 14, pressures of the oxygen and hydrogen within the fuel cell stack 14, and known properties of the fuel cell stack 14 such as size, materials, and the like, with the controller 50B outputting an estimated oxygen level. Once the controller 50B determines that oxygen is present in the anode plate 14A, the controller 50 may register that an air start is active. The method 100 proceeds to step S107 if an air start is detected. Otherwise, the controller 50B determines that a hydrogen start is active and proceeds instead to step S108. In either case, the controller 50B automatically switches the operating mode of the boost converter 30 from current control to voltage control, such that the duty cycle of the boost converter 30 is controlled as a function of the stack current ($V_S$).

Steps S107, S109, and S111 include controlling the anode pressurization, cathode fill, and voltage stabilization stages via the controller 50A and the boost converter 30 in a manner suited to minimizing the impact of the detected air start, and then proceeding to step S114. Similarly, steps S108, S110, and S112 are executed before proceeding to step S114, and include controlling the anode pressurization, cathode fill, and voltage stabilization states in a manner suited to the hydrogen start. The differences in operation may be seen by comparing the trajectories of FIGS. 2A and 2B.

When controlling a hydrogen start as shown in FIG. 2A, the hydrogen start begins at or near 0 VDC at t0. As air enters the fuel cell stack 14 of FIG. 1 from the cathode plate 14C, the stack voltage ($V_S$) is allowed to rise to the level of (V1) at a faster rate between t1 and t2. The stack voltage ($V_S$), once it reaches the level of (V1), will then be allowed to gradually reach $V_{MAX}$ at a reduced rate between t2 and t3.

When controlling an air start as shown in FIG. 2B, the controller 50B controls the boost converter 30 so as to achieve multiple different voltage rise rates, i.e., $K_1$, $K_2$, and $K_3$. Step S107 controls anode pressurization with the voltage rise to voltage level V1 at a first rate ($K_1$) between t0 and t1. Then, step S109 controls the cathode fill stage to a higher voltage level V2 at second and third rates ($K_2$ and $K_3$), with the second rate ($K_2$) as shown in FIG. 2B being less than the first rate ($K_1$). Upon reaching the higher voltage level (V2), the controller 50B may slowly taper the stack voltage ($V_S$) until the maximum voltage ($V_{MAX}$) is reached. Thereafter, at step S114, control of the boost converter 30 may revert to current control for steady-state operation of the fuel cell stack 14.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed is:

1. A fuel cell system comprising:
   a fuel cell stack having a plurality of fuel cells and a stack voltage;
   a direct current-direct current (DC-DC) boost converter; and
   a controller configured to regulate the stack voltage via the DC-DC boost converter during start-up of the fuel cell stack, and programmed with a plurality of calibrated voltage profiles each having a corresponding magnitude and rate of change;
   wherein the controller is configured to detect an air start of the fuel cell stack in response to a requested start-up of the fuel cell stack, and responsive to the detected air start, to enforce a predetermined voltage profile of the stack voltage during an actual start-up of the fuel cell stack via regulation of the DC-DC boost converter using the plurality of calibrated voltage profiles.

2. The fuel cell system of claim 1, wherein the calibrated voltage profiles include a first voltage profile corresponding to an anode pressurization stage and a second voltage profile corresponding to a cathode fill stage, with the second voltage profile having a rate of change that is less than that of the first voltage profile.

3. The fuel cell system of claim 1, wherein the controller is programmed to detect the air start of the fuel cell stack using an output of a Gas Concentration Estimation (GCE) model, wherein the output of the GCE model is an estimated oxygen level in an anode plate of the fuel cell stack.

4. The fuel cell system of claim 3, wherein the controller is configured to receive, as a set of inputs, each of an off time, a temperature, and a pressure value of the fuel cell stack, and wherein the output of the GCE model is determined as a function of the set of inputs.

5. The fuel cell system of claim 1, wherein the DC-DC boost converter includes a semiconductor switch and a gate drive circuit, and the controller is configured to apply the voltage profiles by controlling a duty cycle of the semiconductor switch via the gate drive circuit during a voltage recovery operating mode.

6. The fuel cell system of claim 5, wherein the controller includes a microprocessor that is part of the DC-DC boost converter, and that controls the duty cycle of the semiconductor switch during the voltage recovery operating mode.

7. The fuel cell system of claim 1, wherein the controller is configured to enforce the voltage profiles after the start-up is complete by controlling the DC-DC boost converter in a current control mode.

8. The fuel cell system of claim 1, further comprising:
   a battery;
   a power inverter module (PIM) electrically connected to the battery;
   an axle; and
   an electric machine operable for outputting torque to the axle.

9. The fuel cell system of claim 8, further comprising a road wheel that is rotatably connected to the axle.

10. A vehicle comprising:
    a fuel cell stack having a plurality of fuel cells and a stack voltage;
    a direct current-direct current (DC-DC) boost converter;

a battery pack electrically connected to the fuel cell stack and having a DC output voltage;

a power inverter module (PIM) electrically connected to the battery pack and configured to convert the DC output voltage to an alternating current (AC) voltage;

an electric machine electrically connected to the PIM and energized via the AC voltage to produce an output torque;

a drive wheel connected to the electric machine and driven via the output torque from the electric machine to propel the vehicle; and a controller operable for regulating the stack voltage via the DC-DC boost converter during start-up of the fuel cell stack, and programmed with a plurality of calibrated voltage profiles each having a corresponding magnitude and rate of change, wherein the controller is configured to detect an air start of the fuel cell stack in response to a requested start-up of the fuel cell stack, and responsive to the detected air start, to enforce a predetermined voltage profile of the stack voltage during an actual start-up of the fuel cell stack via regulation of the DC-DC boost converter using the plurality of calibrated voltage profiles.

11. The vehicle of claim 10, wherein the calibrated voltage profiles include a first voltage profile corresponding to an anode pressurization stage and a second voltage profile corresponding to a cathode fill stage, with the second voltage profile having a rate of change that is less than that of the first voltage profile.

12. The vehicle of claim 10, wherein the controller is programmed to detect the air start of the fuel cell stack using an output of a Gas Concentration Estimation (GCE) model, wherein the output of the GCE model is an estimated oxygen level in an anode plate of the fuel cell stack.

13. The vehicle of claim 12, wherein the controller is configured to receive, as a set of inputs, each of an off time, a temperature, and a pressure value of the fuel cell stack, and wherein the output of the GCE model is determined as a function of the set of inputs.

14. The vehicle of claim 10, wherein the DC-DC boost converter includes a semiconductor switch and a gate drive circuit, and wherein the controller is configured to apply the voltage profiles by controlling a duty cycle of the semiconductor switch via the gate drive circuit during a voltage recovery operating mode.

15. The vehicle of claim 14, wherein the controller includes a microprocessor that is part of the DC-DC boost converter, and that controls the duty cycle of the semiconductor switch during the voltage recovery operating mode.

16. The vehicle of claim 11, wherein the controller is configured to enforce the voltage profiles after the start-up is complete by controlling the DC-DC boost converter in a current control mode.

17. A method for use with a fuel cell stack having a plurality of fuel cells and a stack voltage, the method comprising:

detecting an air start of the fuel cell stack via a controller in response to a requested start-up of the fuel cell stack, wherein the controller is programmed with a plurality of calibrated voltage profiles each having a corresponding magnitude and rate of change; and responsive to the detected air start, enforcing a predetermined voltage profile of the stack voltage via the controller during an actual start-up of the fuel cell stack, including regulating operation of a direct current-direct current (DC-DC) boost converter using the plurality of calibrated voltage profiles;

wherein the calibrated voltage profiles include a first voltage profile corresponding to an anode pressurization stage and a second voltage profile corresponding to a cathode fill stage, with the second voltage profile having a rate of change that is less than that of the first voltage profile.

18. The method of claim 17, wherein detecting the air start of the fuel cell stack includes using an estimated oxygen level in an anode plate of the fuel cell stack as an output of a Gas Concentration Estimation (GCE) model, the method further comprising: receiving, as a set of inputs to the GCE model, each of an off time, a temperature, and a pressure value of the fuel cell stack.

19. The method of claim 17, wherein the DC-DC boost converter includes a semiconductor switch and a gate drive circuit, and wherein enforcing the predetermined voltage profile includes controlling a duty cycle of the semiconductor switch via the gate drive circuit during a voltage recovery operating mode.

20. The method of claim 19, further comprising: enforcing the voltage profiles via the controller after the start-up is complete by controlling the DC-DC boost converter in a current control mode.

* * * * *